United States Patent [19]

Arnal et al.

[11] 4,331,788

[45] May 25, 1982

[54] PROCESS OF POLYMERIZING VINYL CHLORIDE IN SEEDED MICROSUSPENSION

[75] Inventors: Claude Arnal, Saint-Auban; Nicolas Fischer, Ecully; Jean-Bernard Pompon, Saint Auban, all of France

[73] Assignee: Chloe Chimie, Paris, France

[21] Appl. No.: 178,466

[22] Filed: Aug. 15, 1980

[30] Foreign Application Priority Data

Aug. 28, 1979 [FR] France ................................ 79 21524

[51] Int. Cl.[3] ............................ C08F 2/20; C08F 4/50

[52] U.S. Cl. ......................................... 526/91; 526/74; 526/93; 526/94; 526/201; 526/202; 526/236

[58] Field of Search ...................... 526/91, 93, 94, 236

[56] References Cited

U.S. PATENT DOCUMENTS

| | | | |
|---|---|---|---|
| 3,817,959 | 6/1974 | Balwé | 526/200 |
| 3,926,910 | 12/1975 | Mowdood | 260/45.95 C |
| 4,091,197 | 5/1978 | Fischer | 526/91 |
| 4,118,556 | 10/1978 | König | 526/229 |

*Primary Examiner*—C. A. Henderson

*Attorney, Agent, or Firm*—McDougall, Hersh & Scott

[57] ABSTRACT

A process for the preparation of homo- and co-polymers of vinyl chloride by polymerization in seeded microsuspension, which comprises effecting polymerization in the presence of one or more seeding products in the form of dispersions of particles of polymers, the particles of at least one of the seeding products containing the initiator required for polymerization and said initiator being activated by an organosoluble metal complex and nitric acid.

5 Claims, No Drawings

PROCESS OF POLYMERIZING VINYL CHLORIDE IN SEEDED MICROSUSPENSION

The present invention relates to an improvement in the process for the preparation of homo- and co-polymers of vinyl chloride by polymerization in seeded microsuspension.

BACKGROUND OF THE INVENTION

It is known from U.S. Pat. No. 3,879,364 that polymerization in microsuspension of vinyl chloride in the presence of a seeding material, containing all the initiator required for polymerization, enjoys the advantages, in comparison with polymerization in simple microsuspension, of minimum initiator consumption, greater regularity of reaction, a lower degree of crusting in the reaction zone and a higher level of concentration of polymer in the latex formed.

It is also known from the copending application Ser. No. 914,352, filed June 12, 1978 (now U.S. Pat. No. 4,245,070) which application was filed as a continuation of application Ser. No. 679,654, filed Apr. 23, 1976, and entitled "Method of Polymerizing Vinyl Chloride in Seeded Microsuspension", that the use, in polymerization of vinyl chloride in microsuspension, of at least two seeding substances comprising different particle sizes, of which at least one of said substances contains all the initiator required for polymerization, makes it possible further to increase the concentration of polymer in the latex formed, to reduce its viscosity, to improve the granulometry of the particles and to produce substances having properties which make them particularly suitable for the preparation of plastisols.

Moreover, it is known from U.S. Pat. No. 4,091,197 that it is possible to reduce the amount of initiator used, increase the polymerization speed, and reduce the formation of crusting in the reaction zone, by activating the initiator, throughout the polymerisation operation, by an organo-soluble metal complex which is prepared beforehand or which is formed in situ by reaction between a water-soluble metal salt and a complexing agent.

Although the above-described processes permit vinyl chloride polymers to be produced by seeded microsuspension polymerisation on an industrial scale, it is essential to try to make improvements:

either in the reaction process in order to increase the profitability by reducing the polymerisation time and the amount of crusting formed, or to reduce the dangers of pollution by the monomer, with higher rates of conversion;

or in the substances to be produced, for example by reducing the amounts of water-soluble metal salts, the residues of which can cause degradation of the properties of the vinyl chloride polymer, in regard to heat stability and stability in respect of ultra-violet rays.

The improvement according to this invention makes it possible to achieve such improvements.

SUMMARY OF INVENTION

It comprises effecting polymerisation in microsuspension of vinyl chloride or a mixture of vinyl chloride and at least one copolymerisable monomer in the presence of one or more seeding substances in the form of dispersions of particles of vinyl polymers which are prepared beforehand and wherein the particle sizes are different from each other and wherein at least one is produced by polymerisation in microsuspension and contains all of the organo-soluble initiator required for polymerisation, said initiator being activated throughout polymerisation by an organo-soluble metal complex which is prepared beforehand or which is formed in situ by reaction between a water-soluble metal salt and a complexing agent, and is characterised in that nitric acid is associated with the organo-soluble metal complex.

In the mixtures of monomers, vinyl chloride represents at least 50% by weight. The copolymerisable monomers are those which are generally used in conventional processes for the copolymerisation of vinyl chloride. These are in particular vinyl esters of mono- and poly-carboxylic acids such as vinyl acetate, propionate and benzoate; unsaturated mono- and poly-carboxylic acids such as acrylic, methacrylic, maleic, fumaric and itaconic acids and their aliphatic, cycloaliphatic, aromatic esters, their amides and their nitriles; vinyl and vinylidene halides; alkylvinylethers; olefines.

The vinyl polymers which form seeding substances are represented by polyvinyl chloride, copolymers of vinyl chloride and the copolymerisable monomers as defined above, homopolymers of said monomers, and copolymers of said monomers with each other. Polymers of the different seeding substances in a single operation may be identical or different.

The seeding substance which contains the initiator (hereinafter referred to as the first seeding substance) is prepared by conventional methods of polymerisation in microsuspension, that is to say, polymerisation in the presence of organo-soluble initiators of at least one monomer dispersed by forcible mechanical means (homogenised) in an aqueous medium containing an emulsifying agent as a stabilising agent. It is in the form of an aqueous dispersion of particles of polymer, whose mean diameter is from 0.05 to 1.5 μm and preferably from 0.2 to 1 μm.

The organo-soluble initiators which are required for polymerisation and which are included in the polymer particles are generally organic peroxides, such as diacyl peroxides, among which we may mention lauroyl, decanoyl, caproyl peroxides, tertiobutyl diethylperacetate, diethylhexyl percarbonate and diacetyl peroxide.

The choice of initiator depends on its speed of decomposition at the reaction temperature adopted. A plurality of organo-soluble initiators can be used; in this case, they are preferably so selected as to be of different reactivity.

The organo-soluble initiators which are included in the seeding polymer particles represent from 0.05 to 5% by weight of said polymer.

The other seeding substance or substances, where appropriate, are in the form of dispersions of particles of vinyl polymer which may or may not contain an initiator and whose mean diameters, which are different from each other and different from that of the first seeding substance, are from 0.02 to 1.5 μm and preferably from 0.02 to 0.8 μm. These dispersions of particles may be produced by conventional processes of polymerisation in microsuspension or in emulsion.

In the polymerisation according to the invention, the amount of seeding substance or substances to be used must be such that the amount of polymer which it contains or they contain represents from 1 to 50% by weight with respect to the sum of vinyl chloride with or without comonomers to be polymerised + seeding polymer(s).

When two or more than two seeding polymers are used, the proportion of the first with respect to the other or others, which depends on the composition of the polymer to be produced, is from 95/5 to 5/95. In addition, the proportions of the seeding substances relative to each other and the total amount of the seeding substances are so selected that the amount of organo-soluble initiator which is included in the polymer particles is sufficient to effect polymerisation or copolymerisation without the supplementary addition of initiator.

The amount of water required for polymerisation must be such that the initial concentration in respect to polymer(s) in the seeding substance or substances, plus the vinyl chloride with or without other copolymerisable monomer, bearing in mind the water content of the seeding substance or substances, is from 20 to 80% and preferably from 45 to 75% by weight with respect to the reaction mixture.

The substance or substances for seeding in the microsuspension mode, which is or are present in the polymerisation medium, is or are sufficient to ensure dispersion of the monomer, without it being necessary to have recourse to fresh homogenisation of the medium.

In order to improve the stability of the microsuspension, it may be advantageous for at least one anionic emulsifying agent, possibly in association with at least one non-ionic emulsifying agent, to be added before and/or in the course of polymerisation, in successive fractions or continuously. The anionic emulsifying agents are preferably represented by fatty acid soaps; alkyl sulphates, alkyl sulphonates, alkyaryl sulphonates, alkyl phenoxybenzene sulphonates, vinyl sulphonates, allyl sulphonates, alkyl sulphosuccinates and alkyl phosphates of alkali metals. The non-ionic emulsifying agents are preferably represented by polycondensates of ethylene oxide or propylene oxide on various hydroxylated organic compounds.

The amounts of emulsifying agent may represent up to 3% by weight of the vinyl chloride or the vinyl chloride-copolymerisable monomer mixture. These are the amounts which are generally used in order to achieve a useful effect in the reaction. However, it is not a departure from the scope of the present invention, to use amounts which are outside the above-indicated limits, the emulsifying agents acting only as a stabilising agent for the microsuspension and having no action on the granulometry of the particles.

The reaction mixture is heated under autogenous pressure at the polymerisation temperature as determined by the properties of the vinyl chloride polymer, depending on the molecular weights which are to be obtained. The temperature is generally from 10° to 85° C. and preferably from 30° to 70° C.

In order to accelerate the speed of polymerisation, the initiator which is included in the particles of the seeding substance or substances is activated throughout polymerisation by an organo-soluble metal complex which is formed beforehand or in situ by reaction between a water-soluble metal salt and a complexing agent.

The metal salt is used in an amount such that the metal salt/initiator molar ratio is from 0.05 to 8. The metal is represented more particularly by iron, copper, cobalt, nickel, zinc, tin, titanium, vanadium, manganese, chromium and silver and is used in the form of water-soluble salts such as sulphates, chlorides, nitrates or acetates.

The complexing agents to be used are compounds which are capable of causing the metal to go from its water-soluble form to a form which is soluble in vinyl chloride, and which do not have any inhibiting action on polymerization and on activation of the initiator by the metal. Compounds which comply with these requirements may be represented by monocarboxylic acids which are sparingly soluble in water such as perfluorobutyric acid, α-bromolauric acid, sulphosalicylic acid, naphthenic acid, and octoic acid; polycarboxylic acids such as succinic, tartric, maleic, and dihydroxymaleic acids and corresponding anhydrides; alkylphosphoric acids such as di-(2-ethyl-) hexylphosphoric acid; lactones such as ascorbic acid and esters thereof, and butyrolactone; ketones having, in $\alpha$ or $\beta$ position, groups activating the carbonyl function such as acetylactone, 1,3-dihydroxyacetone, and benzoin; and carbazones, such as diphenylthiocarbazone.

The amounts of complexing agent to be used depend somewhat on the polymerization temperature, the cooling capacity of the reactor and the level of purity of the reagents. They are such that the complexing agent/-metal salt molar ratio is from 0.5 to 4.5.

The metal salts may be introduced into the reaction medium before polymerization or in the course of polymerization, in successive fractions or continuously, either alone in aqueous solution or in mixture with a solution of emulsifying agent when it is added in the course of polymerization, or again in aqueous solution with the complexing agent to give the complex before the introduction operation is performed.

The complexing agent is introduced continuously, either alone or with a solution of emulsifying agent, or with the metal salt.

In order to achieve a better level of use of the activator system, nitric acid is added thereto, in amounts such that the nitric acid/metal salt molar ratio is from 0.1 to 5 and preferably from 0.2 to 3.

The nitric acid is introduced into the reaction medium in aqueous solution, either alone, or with the metal salt, or with the complexing agent, or again with the complex.

Activation of the initiator by the complex may be interrupted at any moment by terminating the operation of introducing the complexing agent or the complex and/or causing the metal ion to return from its organo-soluble form to its water-soluble form; this is easily achieved by adding to the reaction medium a sequestering agent which is selected from alkaline salts of the acids of the group of ethylene diamine tetracetic acid represented, in addition to ethylene diamine tetracetic acid, by nitrilotriacetic acid, diethylene triamine pentacetic acid and N(2-hydroxyethyl) ethylene diamine triacetic acid. The sequestering agent is used in proportions ranging up to molar stoichiometry with respect to the metal salt.

The present invention also concerns polymers and copolymers of vinyl chloride, which are prepared by the above-described process, after separation of said polymers and copolymers from the polymerisation medium by any known processes such as filtering, coagulation and draining, scaling, centrifugal decantation and atomisation.

The polymers and copolymers can be used for the production of sheets, films, threads, hollow bodies, cellular materials, moulded articles produced by calendering, extrusion, extrusion-blowing, injection and casting; and for the production of coated coverings, cellular materials, and articles which are moulded by any known processes for using plastisols: coating, rotary casting, or soaking.

PREFERRED EMBODIMENTS OF INVENTION

Embodiments of the invention are given hereinafter by way of non-limiting example.

EXAMPLE 1

The following are introduced into a 25 liter autoclave:

- 5000 g of water;
- 1170 g of a seeding substance prepared by polymerisation in microsuspension, with a concentration of 34.2% by weight, that is, 400 g of polyvinyl chloride containing 7.5 g of lauroyl peroxide and wherein the mean diameter of the particles is 0.494 μm.
- 482 g of a seeding substance prepared by polymerisation in emulsion, having a concentration of 41.5% by weight, that is, 200 g of polyvinyl chloride, which does not contain any initiator, and wherein the mean particle diameter is 0.112 μm;
- 354 g of an aqueous 19.8% by weight solution of sodium dodecylbenzene sulphonate;
- 0.3 g of copper sulphate;
- 10000 g of vinyl chloride.

The reaction mixture is then heated at a temperature of 52° C. under autogenous pressure and maintained at that temperature throughout the reaction.

As soon as the medium reaches 52° C., there is begun the operation of introducing an aqueous solution containing 0.4 g/l of ascorbic acid and 0.16 g/l of nitric acid (d=1.38) at a rate of 0.12 l/h of solution for a period of three hours, then 0.08 l/h for a period of three hours and finally 0.04 l/h until the end of the reaction.

When the pressure in the autoclave has dropped by two bars, that is to say, after ten and a half hours, the operation of introducing the acid solution is stopped and the unreacted monomer is degassed.

17000 g of a dispersion of polymer wherein the concentration in respect of polymer is 57% by weight is obtained, corresponding to a real conversion rate of 91% with respect to the vinyl chloride used.

The weight of crusts in the autoclave is 122 g, corresponding to 1.22% by weight of the vinyl chloride used.

The polymer produced is formed by two populations of particles, which are respectively of mean diameters of 1.12 μm and 0.2 μm.

Example 1 is repeated, by way of comparison, without nitric acid.

The polymerization time is ten hours forty minutes.

The result obtained is 16500 g of a dispersion of polymer, wherein the concentration in respect of polymer is 55.7% by weight, which is a real conversion rate of 86% by weight with respect to the vinyl chloride used.

The weight of crusts is 175 g, which is 1.75% by weight of the vinyl chloride used.

The mean diameters of the two populations of particles are respectively 1.12 μm and 0.195 μm.

It is noted that the presence of nitric acid makes it possible to achieve a higher conversion rate while producing a smaller amount of crust formation.

EXAMPLE 2

Operation is carried out as in Example 1, but using 0.150 g of copper sulphate instead of 0.3 g.

The results and those of the comparative test without nitric acid are as follows:

| | | Example 2 | Comparative test |
|---|---|---|---|
| Polymerization time | hours | 11.40 | 12 |
| Conversion rate | % by weight | 90.5 | 87 |
| Crusting rate | % by weight | 1.62 | 2.20 |
| Size particles 1 | μm | 1.14 | 1.13 |
| Size particles 2 | μm | 0.20 | 0.19 |

The influence of nitric acid on the results obtained can be observed.

EXAMPLE 3

The mode of operation in this Example is the same as that in Example 2, except that the copper sulphate is not in the reaction vessel but in the same aqueous solution as the ascorbic acid and the nitric acid, in a proportion of 0.25 g/l.

The polymerisation time is ten hours.

The resulting product is 17200 g of a dispersion of polymer wherein the polymer concentration is 57.8% by weight, giving a real conversion rate of 93.5% by weight with respect to the vinyl chloride used.

The degree of crust formation in the reaction vessel is 0.33% by weight of the vinyl chloride used.

The polymer is formed by two populations of particles which are respectively 1.12 μm and 0.194 μm in diameter.

The same test, when carried out without nitric acid, gives the following result:

- a polymerisation time of ten hours fifty minutes;
- a conversion rate of 86.6% by weight;
- a crusting rate of 1.25% by weight of the vinyl chloride;
- particle diameters of 1.11 μm and 0.191 μm.

EXAMPLES 4 TO 9

Example 3 is repeated, with the copper sulphate being replaced by the same amount of another metal salt, or with the ascorbic acid being replaced by the same amount of another complexing agent, with the corresponding comparative tests.

The operating conditions and the results, together with those of Example 3, are set forth in Table I.

EXAMPLE 10

The following are introduced into a 25 liter autoclave:

- 6400 g of water
- 1386 g of a seeding substance prepared by polymerisation in microsuspension, in a concentration of 32.5% by weight, that is to say, 450 g of polyvinyl chloride containing 7.70 g of lauroyl peroxide, wherein the mean diameter of the particles is 0.521 μm; and
- 9000 g of vinyl chloride.

The reaction mixture is then heated at a temperature of 52° C. under autogenous pressure and held at that temperature throughout the reaction.

As soon as the reaction medium has reached a temperature of 52° C., there is begun the operation of simultaneously introducing:

- an aqueous solution containing 58 g/l of sodium dodecylbenzene sulphonate, at a rate of 0.135 l/h, for a period of eight hours;

an aqueous solution containing 0.25 g/l of copper sulphate, 0.4 g/l of ascorbic acid and 0.16 g/l of nitric acid (d=1.38), at a rate of 0.09 l/h.

When the pressure in the autoclave has dropped by two bars, the operation of introducing the solution of complex and nitric acid is stopped and the unreacted monomer is degassed.

By way of comparison, the same test is repeated without nitric acid.

The results obtained are as follows:

| | | Example 10 | Comparative test |
|---|---|---|---|
| Polymerisation time | hours | 10.50 | 15 |
| Weight of dispersion | g | 18400 | 17830 |
| Polymer concentration | % by weight | 45.4 | 44.5 |
| Conversion rate | % by weight | 88 | 83 |
| Crusting rate | % by weight | 1.92 | 2.35 |
| Particle size | μm | 1.11 | 1.11 |

TABLE I

| Ex | Metal salt | Complexing agent | | Polymerisation time Hours | Conversion rate % by weight | Crusting % by weight | Size of particles μm 1 | 2 |
|---|---|---|---|---|---|---|---|---|
| 3 | Copper | | ex. | 10 | 92 | 0.33 | 1.12 | 0.194 |
| | sulphate | Ascorbic acid | test | 10.50 | 86.6 | 1.25 | 1.11 | 0.191 |
| 4 | Colbalt | | ex. | 11.50 | 92 | 0.77 | 1.06 | 0.20 |
| | nitrate | Ascorbic acid | test | 12 | 90 | 1.35 | 1.03 | 0.195 |
| 5 | Copper | | ex. | 10.50 | 91 | 1.05 | 1.10 | 0.188 |
| | nitrate | Ascorbic acid | test | 11.20 | 89 | 1.42 | 1.08 | 0.185 |
| 6 | Copper | | ex. | 17.55 | 86 | 0.3 | 1.10 | 0.184 |
| | sulphate | Citric acid | test | 20 | 76.5 | 1.27 | 1.08 | 0.184 |
| 7 | Copper | | ex. | 18.30 | 89 | 2.20 | 1.13 | 0.187 |
| | sulphate | Tartric acid | test | 20 | 88 | 3.25 | 1.12 | 0.187 |
| 8 | Copper | | ex. | 20.10 | 92.5 | 0.25 | 1.12 | 0.182 |
| | sulphate | Naphthenic acid | test | 20.30 | 91 | 0.45 | 1.11 | 0.182 |
| 9 | Copper | | ex. | 19.45 | 89 | 2.51 | 1.20 | 0.186 |
| | sulphate | Sulphosalicylic acid | test | 20 | 87 | 3 | 1.18 | 0.186 |

EXAMPLE 11

The following are introduced into a 25 liter autoclave:

4000 g of water;

1170 g of a seeding substance prepared by polymerisation in microsuspension, with a concentration of 34.2% by weight, that is to say, 400 g of polyvinyl chloride containing 7.5 g of lauroyl peroxide and wherein the mean diameter of the particles is 0.494 μm.

482 g of a seeding substance prepared by polymerisation in emulsion, with a concentration of 41.5% by weight, that is to say, 200 g of polyvinyl chloride which does not contain any initiator and wherein the mean diameter of the particles is 0.112 μm; and 10000 g of vinyl chloride.

The reaction mixture is then heated at a temperature of 52° C. under autogenous pressure and maintained at that temperature throughout the reaction.

As soon as the reaction medium has reached a temperature of 52° C., there is begun the operation of simultaneously introducing:

an aqueous solution containing 58 g/l of sodium dodecylbenzene sulphonate, at a rate of 0.15 l/h for a period of eight hours;

an aqueous solution containing 0.25 g/l of copper sulphate, 0.4 g/l of ascorbic acid and 0.16 g/l of nitric acid, at a rate of 0.10 l/h, for a period of ten hours thirty minutes.

When the pressure in the autoclave has dropped by two bars, the operation of introducing the solution of complex and nitric acid is stopped and the unreacted monomer is degassed.

By way of comparison:

the same test is repeated without nitric acid (comparative test A);

a test is carried out without nitric acid, but with amounts of activating system such that the products obtained are substantially the same as those of Example 11 (comparative test B).

The operating conditions and the results obtained are indicated below:

| | | Ex. 11 | Comparative test A | Comparative test B |
|---|---|---|---|---|
| Activating system | | | | |
| - copper sulphate | g/l | 0.25 | 0.25 | 0.5 |
| - ascorbic acid | g/l | 0.4 | 0.4 | 0.8 |
| - nitric acid | g/l | 0.16 | 0 | 0 |
| Polymerisation time | hours | 10.40 | 12 | 10.50 |
| Weight of dispersion | g | 17000 | 16470 | 16820 |
| Polymer concentration | % by weight | 56.9 | 56.3 | 57.2 |
| Conversion rate | % by weight | 90.5 | 86.5 | 90.2 |
| Crusting rate | % by weight | 1.2 | 2.34 | 1.5 |
| Size particles 1 | μm | 1.10 | 1.08 | 1.10 |
| Size particles 2 | μm | 0.195 | 0.194 | 0.195 |

It will be noted that, in order to achieve the same result with a copper sulphate-ascorbic acid activating system, the addition of nitric acid makes it possible to reduce by half the amounts of copper sulphate and ascorbic acid, thereby avoiding degradation in respect of the thermal stability of the polyvinyl chloride produced.

EXAMPLE 12

Operation is as in Example 11, except that the copper sulphate is in solution in the solution of emulsifying agent, in a proportion of 0.22 g/l, and not with the ascorbic acid and nitric acid.

By way of comparison, the same test is repeated without nitric acid.

The results obtained are as follows:

| | | Example 12 | Comparative test |
|---|---|---|---|
| Polymerisation time | hours | 11 | 11.25 |
| Weight of dispersion | g | 16800 | 16400 |
| Concentration of polymer | % by weight | 55.5 | 56.6 |
| Conversion rate | % by weight | 87.25 | 86.5 |
| Crusting rate | % by weight | 1.4 | 1.78 |
| Size particles 1 | μm | 1.11 | 1.10 |
| Size particles 2 | μm | 0.180 | 0.180 |

EXAMPLE 13

Operation is as in Example 11 but the ascorbic acid is in the emulsifying agent solution in a proportion of 0.35 g/l and not with the copper sulphate and nitric acid.

The results are as follows:

| | | Example 13 | Comparative test |
|---|---|---|---|
| Polymerisation time | hours | 10.30 | 10.40 |
| Weight of dispersion | g | 17400 | 16900 |
| Concentration of polymer | % by weight | 56.9 | 57 |
| Conversion rate | % by weight | 93 | 90.5 |
| Crusting rate | % by weight | 0.55 | 1.3 |
| Size particles 1 | μm | 1.12 | 1.11 |
| Size particles 2 | μm | 0.182 | 0.180 |

EXAMPLE 14

Example is as in Example 3, but with the 10000 g of vinyl chloride being replaced by 9550 g of vinyl chloride and 450 g of vinyl acetate.

The results obtained are as follows:

| | | Example 14 | Comparative test |
|---|---|---|---|
| Polymerisation time | hours | 10.55 | 11.25 |
| Weight of dispersion | g | 17100 | 16700 |
| Concentration of polymer | % by weight | 57 | 55.9 |
| Conversion rate | % by weight | 91.5 | 87 |
| Crusting rate | % by weight | 1.17 | 1.38 |
| Size particles 1 | μm | 1.14 | 1.13 |
| Size particles 2 | μm | 0.198 | 0.189 |

EXAMPLE 15

The following are introduced into an 800 liter autoclave:

265 kg of de-ionized water;

68.5 kg of a seeding substance produced by polymerisation in microsuspension, with a concentration of 36.8% by weight, that is to say, 25.5 kg polyvinyl chloride, containing 0.3 kg of lauroyl peroxide, and wherein the mean particle diameter is 0.55 μm;

29.7 kg of a seeding substance produced by polymerisation in emulsion, with a concentration of 40.5% by weight, that is to say, 12 kg of polyvinyl chloride which does not contain initiator and wherein the mean particle diameter is 0.13 μm;

17.3 kg of an aqueous 20.3% by weight solution of sodium dodecylbenzene sulphonate; and 500 kg of vinyl chloride.

The reaction mixture produced is then heated at a temperature of 52° C. under autogenous pressure and maintained at that temperature throughout the reaction.

As soon as the medium has reached the temperature of 52° C., there is begun the operation of introducing an aqueous solution containing 0.65 g/l of copper sulphate, 1 g/l of ascorbic acid and 0.83 g/l of nitric acid, at a rate of 2 l/h for a period of four hours, then 1.4 l/h for three hours and finally 0.7 l/h until the end of the reaction.

When the pressure in the autoclave is dropped three bars, the operation of introducing the solution of complex and nitric acid is stopped and the unreacted monomer is degassed.

By way of comparison, Example 15 is repeated, but without nitric acid.

The results obtained are as follows:

| | | Example 15 | Comparative test |
|---|---|---|---|
| Polymerisation time | hours | 12 | 14.10 |
| Weight of dispersion | kg | 879.5 | 852.7 |
| Polymer concentration | % by weight | 60.1 | 59.9 |
| Conversion rate | % by weight | 98 | 94.7 |
| Crusting rate | % by weight | 0.3 | 0.62 |
| Size particles 1 | μm | 1.15 | 1.15 |
| Size particles 2 | μm | 0.2 | 0.195 |

We claim:

1. A process for the preparation of homo- and copolymers of vinyl chloride by polymerization in seeded microsuspension, comprising polymerizing in microsuspension vinyl chloride or a mixture of vinyl chloride and at least one copolymerizable monomer in the presence of one or more seeding substances in the form of previously prepared dispersions of particles of vinyl polymers produced by polymerization in microsuspension and contains all the organo-soluble initiator required for polymerization, activating the initiator throughout the polymerization by addition of previously prepared organo-soluble metal complex or formed in situ by reaction between a water-soluble metal salt and a complexing agent, and characterized in that nitric acid is associated with the organo-soluble metal complex in the molar ratio of nitric acid/metal salt within the range of 0.1 to 5.

2. A process according to claim 1 characterized in that the organo-soluble initiator which is included in the particles of seed polymer is present in an amount ranging from 0.05 to 5% by weight of the polymer.

3. A process according to claim 1 characterized in that the amount of seeding substance or substances to be used is such that the amount of polymer contained therein represents from 1 to 50% by weight of the sum of vinyl chloride or the mixture of vinyl chloride and copolymerizable monomer to be polymerized+seeding polymer(s).

4. A process according to claim 1 characterized in that the metal salt/initiator molar ratio is from 0.05 to 8.

5. A process according to claim 1 characterized in that the complexing agent/metal salt molar ratio is from 0.5 to 4.5.

* * * * *